United States Patent
An et al.

(10) Patent No.: US 10,341,336 B2
(45) Date of Patent: Jul. 2, 2019

(54) ELECTRONIC DEVICE AND METHOD FOR GENERATING RANDOM AND UNIQUE CODE

(71) Applicant: INNOAUS KOREA INC., Seoul (KR)

(72) Inventors: Young-Taek An, Victoria (AU); Yoo-Jin Kang, Seoul (KR)

(73) Assignee: INNOAUS KOREA INC., Seoul (KR)

( * ) Notice: Subject to any disclaimer, the term of this patent is extended or adjusted under 35 U.S.C. 154(b) by 216 days.

(21) Appl. No.: 15/192,684

(22) Filed: Jun. 24, 2016

(65) Prior Publication Data
US 2017/0006026 A1   Jan. 5, 2017

(30) Foreign Application Priority Data
Jul. 1, 2015   (KR) .......................... 10-2015-0094374

(51) Int. Cl.
*H04L 29/06* (2006.01)
*G06F 16/84* (2019.01)
(Continued)

(52) U.S. Cl.
CPC .......... *H04L 63/0838* (2013.01); *G06F 16/84* (2019.01); *H04L 9/0863* (2013.01);
(Continued)

(58) Field of Classification Search
CPC . H04L 63/0838; H04L 63/0853; H04L 63/10; H04L 63/0846; H04L 9/3228; H04L 9/0863; H04L 9/0869
See application file for complete search history.

(56) References Cited

U.S. PATENT DOCUMENTS 4,879,747 A * 11/1989 Leighton .............. G06Q 20/347
                                                            235/379
5,661,807 A   8/1997 Guski et al.
(Continued)

FOREIGN PATENT DOCUMENTS

CN   1731721 A   2/2006
CN   1922845 A   2/2007
(Continued)

OTHER PUBLICATIONS

Borisov, Alexander. "A novel approach for user authentication to industrial components using QR codes." 2015 IEEE 39th Annual Computer Software and Applications Conference. vol. 3. pp. 61-66. IEEE, 2015. (Year: 2015).*
(Continued)

*Primary Examiner* — Kari L Schmidt
(74) *Attorney, Agent, or Firm* — Mintz Levin Cohn Ferris Glovsky and Popeo, P.C.; Kongsik Kim; Jhongwoo Jay Peck

(57) ABSTRACT

According to an embodiment of the present disclosure, an electronic device comprises a communication module, a memory storing a first seed for generating a one-time password (OTP), a character set and a first unique code assigned to a first user, and a processor, wherein the processor is configured to generate a first OTP using the first seed, generate a first sub code by mapping an operation result of the first unique code and the first OTP to the character set, generate a second sub code by mapping the first OTP to the character set, generate a code using the first sub code and the second sub code, and transmit the generated code to another electronic device through the communication module.

19 Claims, 14 Drawing Sheets

(51) Int. Cl.
*H04L 9/08* (2006.01)
*H04L 9/32* (2006.01)

(52) U.S. Cl.
CPC .......... *H04L 9/0869* (2013.01); *H04L 9/3228* (2013.01); *H04L 63/0853* (2013.01); *H04L 63/10* (2013.01); *H04L 63/0846* (2013.01)

(56) References Cited

U.S. PATENT DOCUMENTS

| | | | | |
|---|---|---|---|---|
| 8,255,696 B2* | 8/2012 | Florencio | ................ | G06F 21/46 705/64 |
| 8,312,519 B1* | 11/2012 | Bailey | ................ | H04L 9/003 380/255 |
| 8,412,928 B1* | 4/2013 | Bowness | ............ | H04L 63/0838 713/155 |
| 8,904,482 B1 | 12/2014 | Dotan et al. | | |
| 8,909,933 B2* | 12/2014 | Pieczul | ................ | H04L 9/3215 713/168 |
| 9,002,750 B1* | 4/2015 | Chu | .................... | H04L 63/0838 705/55 |
| 9,172,698 B1* | 10/2015 | Evans | ................ | H04L 63/0853 |
| 9,218,476 B1* | 12/2015 | Roth | .................... | H04L 63/0838 |
| 9,621,526 B2* | 4/2017 | Abrahamson | ........ | H04L 63/065 |
| 2003/0016821 A1* | 1/2003 | Hammersmith | ...... | H04L 9/0822 380/37 |
| 2003/0105964 A1 | 6/2003 | Brainard et al. | | |
| 2006/0034456 A1* | 2/2006 | McGough | ............ | H04L 9/0844 380/30 |
| 2007/0050635 A1* | 3/2007 | Popp | .................... | H04L 9/0863 713/185 |
| 2007/0094716 A1* | 4/2007 | Farino | ................ | G07C 9/00103 726/5 |
| 2007/0220597 A1* | 9/2007 | Ishida | ................... | G06Q 20/12 726/8 |
| 2007/0234064 A1* | 10/2007 | Nihei | ...................... | G06F 21/34 713/183 |
| 2008/0072058 A1* | 3/2008 | Cedar | .................... | G06F 21/34 713/184 |
| 2008/0132235 A1* | 6/2008 | Hancock | ............ | H04L 63/0838 455/436 |
| 2008/0276098 A1* | 11/2008 | Florencio | ................ | G06F 21/46 713/183 |
| 2009/0064294 A1* | 3/2009 | Cook | ..................... | G06F 21/34 726/6 |
| 2009/0172775 A1* | 7/2009 | Mardikar | .............. | H04L 63/083 726/2 |
| 2009/0220075 A1* | 9/2009 | Sidhu | ...................... | G06F 21/31 380/45 |
| 2010/0242104 A1 | 9/2010 | Wankmueller et al. | | |
| 2011/0030053 A1* | 2/2011 | Lin | .......................... | G06F 21/34 726/20 |
| 2011/0289576 A1* | 11/2011 | Cheng | ..................... | G09C 1/00 726/9 |
| 2012/0131655 A1* | 5/2012 | Bender | ................... | G06F 21/34 726/6 |
| 2012/0137352 A1 | 5/2012 | Smales | | |
| 2012/0192253 A1* | 7/2012 | Betsch | .................... | G06F 21/31 726/4 |
| 2012/0266224 A1* | 10/2012 | Gruschka | ................ | G06F 21/35 726/7 |
| 2013/0124292 A1* | 5/2013 | Juthani | .................... | G06F 21/41 705/14.26 |
| 2013/0132731 A1* | 5/2013 | Ruan | ........................ | G06F 21/34 713/184 |
| 2013/0185780 A1* | 7/2013 | Varadharajan | ........ | G06F 21/335 726/6 |
| 2014/0189831 A1* | 7/2014 | Kemshall | .............. | H04L 9/3228 726/6 |
| 2015/0128234 A1 | 5/2015 | Xavier et al. | | |
| 2015/0220728 A1* | 8/2015 | Bakir | ...................... | G06F 21/36 726/18 |
| 2015/0281222 A1* | 10/2015 | Burch | ................. | H04L 63/0838 726/6 |
| 2015/0295907 A1* | 10/2015 | Abrahamson | ......... | H04L 63/065 713/150 |
| 2016/0149893 A1* | 5/2016 | Perrot | ..................... | H04L 63/06 726/7 |
| 2017/0061138 A1* | 3/2017 | Lambert | ................. | H04L 63/18 |

FOREIGN PATENT DOCUMENTS

| | | |
|---|---|---|
| CN | 101000673 A | 7/2007 |
| CN | 103067892 A | 4/2013 |
| CN | 103370688 A | 10/2013 |
| CN | 105095701 A | 11/2015 |
| JP | 2006-018773 A | 1/2006 |
| JP | 2007-523431 A | 8/2007 |
| JP | 2010-102637 A | 5/2010 |
| JP | 2015-515218 A | 5/2015 |
| KR | 10-2011-0039947 A | 4/2011 |
| KR | 1020130042160 A | 4/2013 |
| KR | 10-2015-0004540 A | 1/2015 |
| WO | WO-2014201137 A1 | 12/2014 |

OTHER PUBLICATIONS

W. Luo, Y. Hu, H. Jiang and J. Wang, "Authentication by Encrypted Negative Password," in IEEE Transactions on Information Forensics and Security, vol. 14, No. 1, pp. 114-128, Jan. 2019. (Year: 2019).*

Halderman, J. Alex, Brent Waters, and Edward W. Felten. "A convenient method for securely managing passwords." Proceedings of the 14th international conference on World Wide Web. pp. 471-479. ACM, 2005. (Year: 2005).*

EP Search Report dated Nov. 11, 2016 in corresponding European Patent Application No. EP 16177239.7.

Japanese Office Action dated Jun. 5, 2017 in correspondence Japanese Application No. JP 2016-131405.

European Office Action dated Jul. 24, 2017 in corresponding European Patent Application No. 16177239.7.

Examination Report dated Feb. 24, 2017 in corresponding Australian Patent Application No. 2016204540.

First Office Action dated Feb. 2, 2019 in corresponding Chinese Patent Application No. 201610516618.2.

* cited by examiner

US 10,341,336 B2

ELECTRONIC DEVICE AND METHOD FOR GENERATING RANDOM AND UNIQUE CODE

CROSS-REFERENCE TO RELATED APPLICATION(S)

This application claims priori to Korean Application No. 10-2015-0094374 filed on Jul. 1, 2015, which is incorporated herein by reference.

TECHNICAL FIELD

The present disclosure relates to electronic devices and methods for generating random and unique codes, and more specifically, to electronic devices and methods for generating random and unique codes using time-based one-time passwords.

RELATED ART

Operating systems and all other computer application systems may uniquely generate identifiers (IDs) and assign them to respective corresponding users in order to distinguish accessing users from one another. To address the characteristic of such an ID that may be easily exposed or leak out, a password that may be easily memorized by the user may be generated, mapped with the ID, and managed together with the ID. Using a password along with an ID leads to further enhanced security as compared with when the ID is exposed.

However, a user tends to generate a simple type of password, e.g., '12345678,' for easier memory. This subjects the password to more vulnerability that causes others or hackers to readily guess the password. Even assuming that a sophisticated password (e.g., aB3Pe#28dwqP) is established, a hacker might easily figure out the ID and password using an advanced hacking technique, e.g., a hacking tool such as Key Logger. To address such situation, the system requires the user to periodically vary complicated passwords (requiring, e.g., a predetermined length or a combination of upper/lower cases, special characters, or letters). In real life, however, a user has significant difficulty in memorizing such password, and thus, he jots down his IDs and passwords for the respective systems for later use.

However, mere use of ID and password presents its limitation in security due to developed hacking techniques. A compensating method is so-called two-factor authentication in which what is carried out by the user alone (e.g., one-time password generator, one-time password (OTP) token, security card, etc.) is used along with the information (ID/password) memorized by the user.

In other words, this allows the ID/password memorized by the user to be used together with what is possessed by the user, such as OTP token or security card. The two-factor authentication is called so because it uses both the ID/password recognized (memorized) by the user-knowledge factor- and what is possessed by the user-possession factor. A further advanced version is multi-factor authentication where various factors, e.g., user's bio information (e.g., fingerprint, iris, or voice recognition information) are used together for user authentication.

In fact, an ID is sufficient to distinguish users accessing a system from each other. However, a user is required to use multiple factors along with a password for better security purposes. This may mean that user authentication techniques are being researched/developed for systems rather than users.

A one-time code is a character string constituted of ASCII codes and includes a combination of alphanumerics, {'0', . . . , '9', 'A', . . . , 'Z', 'a', . . . , 'z'}, and displayable ASCII characters, {'!', '@', . . . }. This is a predetermined length of ID randomly generated, rather than an actual user ID in registration in the system and means a character string consisting of characters included in a given character set.

For example, assuming that the given character set is {'0', . . . , '9', 'A', . . . , 'Z'} with a length of 6, random IDs assigned to the user become 'A012ZE', 'KABFZE', '019D3F', . . . . Here, the one-time code assigned to the user should be unique. That is, the maximum number of codes generatable using the given character set is as follows: 36 (26 (which is the number of the capital letters in the alphabet)+10 (which is the number of the numbers))^6 (length of the random ID)=2,176,782,336.

To periodically generate such code as a combination of different characters, TOTP (RFC6238) is used, and each digit in the generated TOTP is used as an index of the given character set, thus generating a unique and random code. However, an OTP algorithmwise presents the probability that the same result comes out when other SEEDs are used at the same time. That is, it may be likely to cause a conflict. As a result, use of TOTP alone cannot meet the uniqueness requirement for an ID, rendering it difficult for the ID to be available.

The above information is presented as background information only to assist with an understanding of the present disclosure. No determination has been made, and no assertion is made, as to whether any of the above might be applicable as prior art with regard to the present disclosure.

SUMMARY

As discussed supra, conventional techniques to distinguish users operate based on schemes where IDs and passwords are fixed and may thus cause exposure of user IDs and passwords. The present disclosure has been conceived to address such issues, and according to embodiments of the present disclosure, there are provided electronic devices and methods for generating random and unique codes.

According to an embodiment of the present disclosure, a method for generating a code comprises obtaining a first seed for generating a one-time password (OTP), a character set and a first unique code assigned to a first user, generating a first OTP using the first seed, generating a first sub code by mapping an operation result of the first unique code and the first OTP to the character set, generating a second sub code by mapping the first OTP to the character set, and generating the code using the first sub code and the second sub code.

According to an embodiment of the present disclosure, an electronic device generating a code comprises a memory and a processor electrically connected with the memory, wherein the memory may store instructions executed to enable the processor to obtain a first seed for generating a one-time password (OTP), a character set and a first unique code assigned to a first user, generate a first OTP using the first seed, generate a first sub code by mapping an operation result of the first unique code and the first OTP to the character set, generate a second sub code by mapping the first OTP to the character set, and generate the code using the first sub code and the second sub code.

According to an embodiment of the present disclosure, an electronic device comprises a communication module, a memory storing a first seed for generating a one-time password (OTP), a character set and a first unique code assigned to a first user, and a processor, wherein the processor is configured to generate a first OTP using the first seed, generate a first sub code by mapping an operation result of the first unique code and the first OTP to the character set, generate a second sub code by mapping the first OTP to the character set, generate a code using the first sub code and the second sub code, and transmit the generated code to another electronic device through the communication module.

According to an embodiment of the present disclosure, an electronic device performing authentication comprises a communication module receiving a first code from another electronic device, a memory storing a first seed for generating a one-time password (OTP), a character set and a first unique code assigned to a first user, and a processor, wherein the processor may be configured to generate a first OTP using the first seed, generate a first sub code by mapping an operation result of the first unique code and the first OTP to the character set, generate a second sub code by mapping the first OTP to the character set, generate a second code using the first sub code and the second sub code, when the second code is identical with the first code received through the communication module, perform authentication, and when the second code is not identical with the first code received through the communication module, abstain from performing authentication.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Hereinafter, exemplary embodiments of the present disclosure are described in detail with reference to the accompanying drawings. However, the present disclosure is not limited to the exemplary embodiments. The reference numbers in each figure denote members substantially performing the same function.

Figure 1:
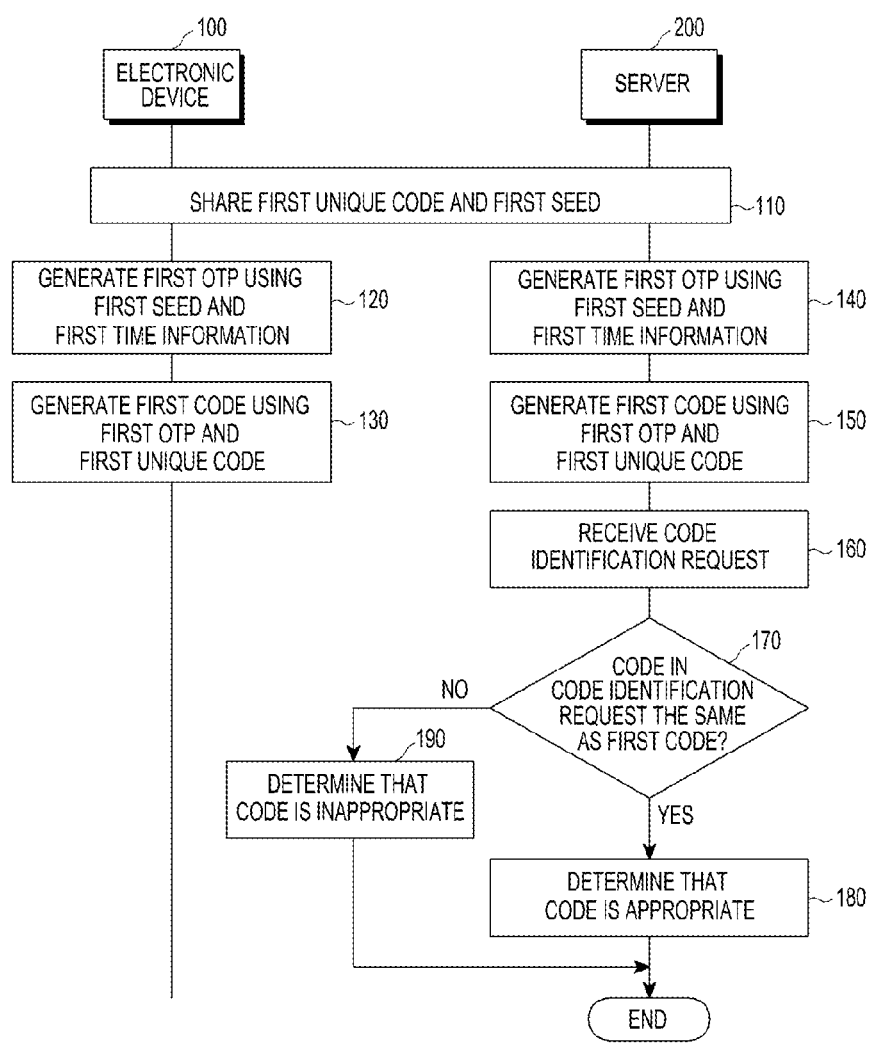
FIG. 1 is a flowchart illustrating a method for generating a unique code according to an embodiment of the present disclosure.

FIG. 1 is a flowchart illustrating a method for generating a unique code according to an embodiment of the present disclosure.

In the embodiment according to FIG. 1, the first electronic device 100 may be an electronic device generating unique codes, and a server 200 may be an electronic device generating unique codes and verifying unique codes requested for verification. The server 200 may be an electronic device managing a service using a unique code. For example, the server 200 may be an electronic device managing a web service, and the server 200 may manage user IDs and their corresponding login information.

In operation 110, the first electronic device 100 may share a first unit cell and a first seed with the server 200. According to an embodiment of the present disclosure, the server 200 may transmit the first unique seed and the first seed to the first electronic device 100 when enrolling a first user using the first electronic device 100 in the system. The server 200 may transmit information allowing the first unique code and the first seed to be displayed to another electronic device. For example, the first user may send a request for enrollment to the server 200 through the first electronic device 100 or the other electronic device. The server 200 may assign the first unique code to the first user corresponding to the enrollment request. The server 200 may transmit the first unique code to the first electronic device 100 or the other electronic device. The server 200 may assign the first seed to the first user. The first seed may be assigned to the first user to generate a time-based one-time password. The server 200 may transmit the first seed to the first electronic device 100 or the other electronic device. According to an embodiment of the present disclosure, the server 200 may transmit a QR code image including the first unique code and the first seed to the first electronic device 100 or the other electronic device. The first user may capture an image of the QR code displayed on the other electronic device through the first electronic device 100, and accordingly, the first electronic device 100 may obtain the first unique code and the first seed.

In operation 120, the first electronic device 100 may generate a first one-time password (OTP) using the first seed and first time information. That is, the first electronic device 100 may generate the first OTP using the first time information and the first seed corresponding to a first time at the first time. Further, the first electronic device 100 may generate a second OTP using the first seed and second time information corresponding to a second time at the second time. The first electronic device 100 may dynamically vary the OTP over time and generate the OTP.

In operation 130, the first electronic device 100 may generate a first code using the first OTP and the first unique code. The process in which the first electronic device 100 generates a random and unique first code using the first unique code and the first OTP is described below in greater detail. As the first code is generated using both the first OTP and the first unique code, the first OTP may be secured for randomness, likelihood of dynamic variation, and uniqueness of the first unique code, rendering it random and unique. The randomness and uniqueness of the first code are described below in greater detail.

In operation 140, the server 200 may generate the first OTP using the first seed and the first time information. The server 200 may generate the same first OTP as the one generated by the first electronic device 100 using the first seed and the first time information corresponding to the first time at the first time. The server 200 may generate the same second OTP as the one generated by the first electronic device 100 at the second time using the first seed and the second time information corresponding to the second time at the second time. That is, the server 200 may dynamically vary and generate the OTP.

In operation 150, the server 200 may generate the first code using the first OTP and the first unique code. The scheme in which the server 200 generates the first code using the first OTP and the first unique code may be the same as the scheme in which the first electronic device 100 generates the first code using the first OTP and the first unique code. Accordingly, the first code generated by the server 200 may be the same as the first code generated by the first electronic device 100.

In operation 160, the server 200 may receive a code identification request. The server 200 may receive the code identification request from an electronic device manipulated by the first user, e.g., the first electronic device 100 or the other electronic device.

In operation 170, the server 200 may determine whether the code in the code identification request is the same as the first code generated by the server 200. When the code in the code identification request is the same as the first code generated by the server 200, the server may determine that the code is appropriate in operation 180. When the code in the code identification request is different from the first code generated by the server 200, the server may determine that the code is inappropriate in operation 190. The server 200 may perform or abstain from performing an additional service, such as user login or electronic commerce (e-commerce) payment, depending on whether the code is appropriate or not.

Figure 2:
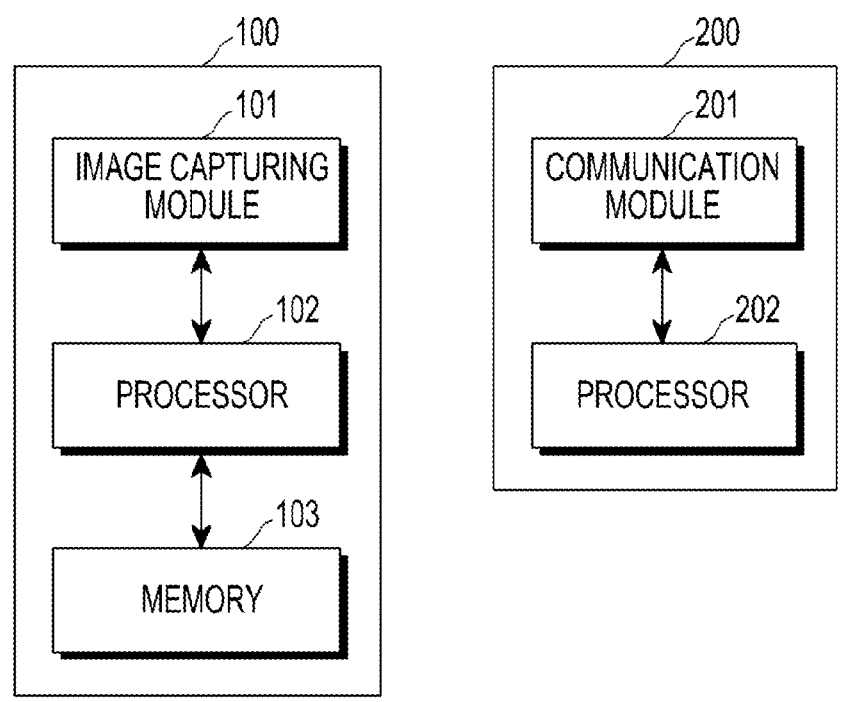
FIG. 2 is a block diagram illustrating an electronic device generating a code according to an embodiment of the present disclosure.

FIG. 2 is a block diagram illustrating an electronic device generating a code according to an embodiment of the present disclosure.

The electronic device 100 may include an image capturing module 101, a processor 102, and a memory 103.

The image capturing module 101 may be a module that may image-capture an external landscape. For example, the processor 102 may obtain information on a seed, unique code, and character set using an image captured through the image capturing module 101.

The processor 102 may include a central processing unit (CPU), a read only memory (ROM) retaining a control program for controlling the electronic device 100, and a random access memory (RAM) that is used to store signals or data input from an outside of a display device 100 or that is used as a storage area for tasks performed on the display device 100. The CPU may include a single core, a dual core, a triple core, or a quad core. The CPU, the ROM, and the RAM may be interconnected with one another via an internal bus.

The memory 103 may include both the ROM and the RAM and may store information on a program or algorithm for generating a code, a seed, a unique code, and a character set.

The memory 103 may store instructions executed to enable the processor 102 to obtain a first seed for generating a one-time password, obtain a first unique code and a character set assigned to a first user, generate a first one-time password (OTP) using the first seed, may a computational result of the first OTP and the first unique code to the character set to generate a first sub code, map the first OTP to the character set to generate a second sub code, and generate the code using the first sub code and the second sub code.

The memory 103 may store instructions executed to enable the processor 102 to generate the first OTP by inputting first time information corresponding to a first time and the first seed to a time-based one-time password algorithm.

The memory 103 may store instructions executed to enable the processor 102 to convert the first unique code into a numerical code by comparing with the character set, summate the numerical code with the first OTP, and generate the first sub code by mapping a result of the summation to the character set.

The memory 103 may store instructions executed to enable the processor 102 to perform a mod operation on the summation result with the size of the character set and generate the first sub code by mapping a result obtained by performing the mod operation on the summation result to the character set.

The memory 103 may store instructions executed to enable the processor 102 to apply a preset offset to the summation result and generate the first sub code by mapping the offset-applied summation result to the character set.

The memory 103 may store instructions executed to enable the processor 102 to perform a mod operation on the offset-applied summation result with the size of the character set and generate the first sub code by mapping a result obtained by performing the mod operation on the summation result to the character set.

The memory 103 may store instructions executed to enable the processor 102 to apply the preset offset to the first OTP and generate the second sub code by mapping the offset-applied first OTP to the character set.

The memory 103 may store instructions executed to enable the processor 102 to perform a mod operation on the offset-applied first OTP with the size of the character set and generate the second sub code by mapping a result obtained by performing the mod operation on the first OTP to the character set.

The memory 103 may store instructions executed to enable the processor 102 to obtain a basic character set and obtain the character set by shuffling elements in the basic character set.

The memory 103 may store instructions executed to enable the processor 102 to obtain the same second seed for all users of the system, generate a second OTP using the second seed, and swap each digit of element in the basic character set with another digit of element using a result obtained by performing a mod operation on the second OTP with the number of the elements in the basic character set.

Meanwhile, the server 200 may include a communication module 201 and a processor 202.

The communication module 201 may transmit the information on the seed, unique code, and character set to the other electronic device in response to a request. Further, the communication module 201 may perform a code identification request including a code.

The processor 202 may assign the unique code to the user. Or, the processor 202 may generate a code corresponding to the code identification request. The processor 202 may determine whether the code identification request is appropriate by comparing the generated code with a code in the code identification request.

Figure 3:
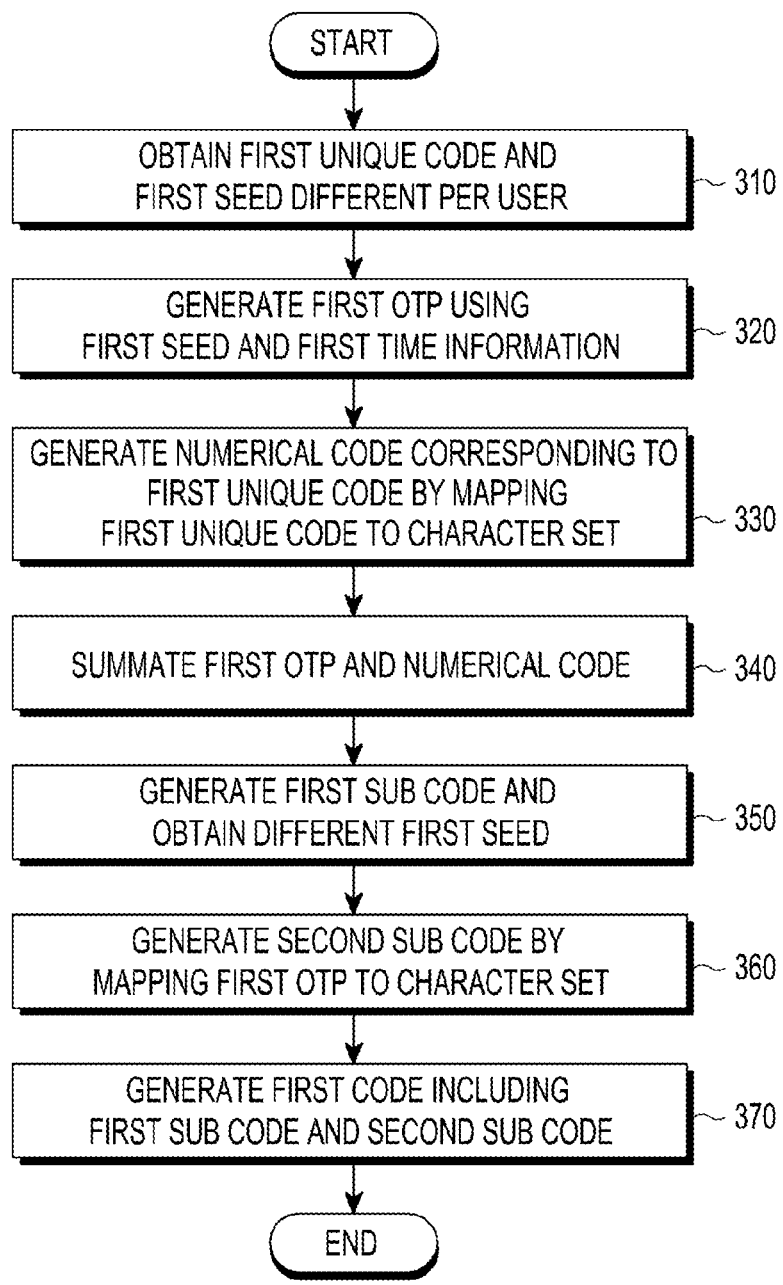
FIG. 3 is a flowchart illustrating a method for generating a code according to an embodiment of the present disclosure.

FIG. 3 is a flowchart illustrating a method for generating a code according to an embodiment of the present disclosure.

In operation 310, the first electronic device 100 may obtain a first seed different from each user and a first unique code. The first seed may be assigned to the first user by the server 200. Meanwhile, the first unique code may be an ASCII code-based character string and may be a combination of an alphabetic character, a numeral, and a special character or symbol. The first unique code may be a code selected from elements in a preset character set. For example, the server 200 may generate the first unique code for the first user using an algorithm generating a unique code from the character set and transmit the same to the first electronic device 100. The server 200 may generate unique codes for other users. The unique codes respectively assigned to the users may differ from each other.

In operation 320, the first electronic device 100 may generate the first OTP using the first seed and the first time information. The first OTP may include, e.g., numerals.

In operation 330, the first electronic device 100 may map the first unique code to a preset character set to generate a numeral code corresponding to the first unique code.

For example, the first electronic device 100 is assumed to use a preset character set, {'0', '1', '2', . . . , '9', 'A', 'B', . . . , 'Z'}. Further, the first electronic device 100 is assumed to obtain the first unique code, "AX83Z0." According to an embodiment of the present disclosure, the first electronic device 100 may convert the number of each digit in the first unique code into a numeral code by identifying what number of index in the character set the number of each digit in the first unique code is. For example, the first electronic device 100 may convert the unique code "A" into a numeral code "10" by identifying that the character "A" which is the first digit of number in the first code is the eleventh index in the character set. This may come from the start point of the numeral code being 0. In the same manner, the first electronic device 100 may convert the unique code "X" into "33" by identifying that "X" is the 34th index in the character set. The first electronic device 100 may convert the first unique code "AX83Z0" into a numeral code {10,33,8,3,35,0}.

In operation 340, the first electronic device 100 may summate the first OTP and the numeral code. For example, when the first OTP is "382901," the first electronic device 100 may summate each digit of number in the first OTP with each digit of number in the converted numeral code. That is, the first electronic device 100 may summate the numeral code {10,33,8,3,35,0} with the first OTP {3,8,2,9,0,1}, producing a summation result {13,41,10,12,35,1}. Meanwhile, when the summation result exceeds the total number, e.g., 36, of the elements in the character set, the first electronic device 100 may replace the summation result with a result obtained by performing a mod operation on the total number of the elements in the character set. In such case, the first electronic device 100 may replace '41' with "5" which is a result of performing a mod operation of 36 on "41." Accordingly, the first electronic device 100 may obtain a summation result of {13,5,10,12,35,1}. Alternatively, upon generating a summation result, an offset may apply, which is described below in greater detail.

In operation 350, the first electronic device 100 may map the summation result to the character set to generate the first sub code. For example, the first electronic device 100 may interpret each numeral in {13,5,10,12,35,1} as an index and obtain a character corresponding thereto from the character set. That is, the first electronic device 100 may obtain "D" corresponding to the index of "13" as a first character of the first sub code. The first electronic device 100 may obtain "5" corresponding to the index of "5" as a second character of the first sub code. As per the above-described scheme, the first electronic device 100 may obtain the first sub code "D5ACY1."

In operation 360, the first electronic device 100 may map the first OTP to the character set to generate the second sub code. For example, the first electronic device 100 may interpret each digit of numeral of the first OTP in {3,8,2,9,0,1} as an index and generate each digit of the characters of the second sub code corresponding to each digit of number. For example, the first electronic device 100 may obtain the character "3" corresponding to the numeral "3" and may obtain the character "8" corresponding to the numeral "8."

Accordingly, the first electronic device 100 may obtain the second sub code "382901." According to an embodiment of the present disclosure, the first electronic device 100 may map a result obtained by applying an offset to each digit of number to the character set to obtain the second sub code, which is described below in greater detail.

In operation 370, the first electronic device 100 may generate the first code including the first sub code and the second sub code. The first electronic device 100 may generate the first code, e.g., "D5ACY1382901," by concatenating the first sub code and the second sub code. As described above, the first sub code, "D5ACY1," of the first code is set by summating the OTP and unique code dynamically and randomly generated, guaranteeing dynamics and randomness as well as uniqueness by the unique code. However, since codes with the same summation result may occur with a lower probability, the first electronic device 100 may generate the first code, a unique code, by concatenating the second sub code according to an embodiment of the present disclosure.

Figure 4:
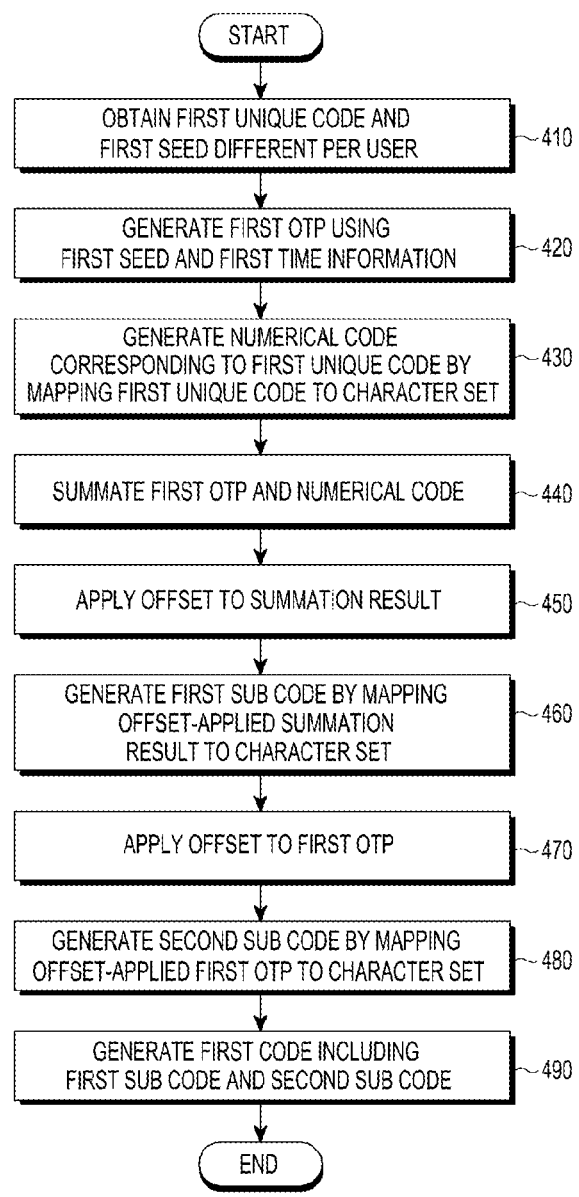
FIG. 4 is a flowchart illustrating a method for generating a code according to an embodiment of the present disclosure.

FIG. 4 is a flowchart illustrating a method for generating a code according to an embodiment of the present disclosure.

In operation 410, the first electronic device 100 may obtain a first seed different from each user and a first unique code. As set forth supra, the first electronic device 100 may receive the first unique code and the first seed by receiving the first unique code and the first seed from the server 200 or image-capturing a QR code displayed on the other electronic device. The first seed may be a seed for generating an OTP assigned by the server to the first user.

In operation 420, the first electronic device 100 may generate the first OTP using the first seed and the first time information. In operation 430, the first electronic device 100 may map the first unique code to a character set to generate a numeral code corresponding to the first unique code. For example, similar to the embodiment described above in connection with FIG. 3, the first electronic device 100 may obtain the first unique code "AX83Z0" and may generate the first OTP "382901" using the first seed and first time information corresponding to a first time at the first time. The first electronic device 100 may convert the first unique code "AX83Z0" into the numeral code {10,33,8,3,35,0} by mapping the first unique code to the preset character set {'0', '1', '2', . . . , '9', 'A', 'B', . . . , 'Z'}.

In operation 440, the first electronic device 100 may summate the first OTP and the numeral code. For example, when the first OTP is "382901," the first electronic device 100 may summate each digit of number in the first OTP with each digit of number in the converted numeral code. That is, the first electronic device 100 may summate the numeral code {10,33,8,3,35,0} with the first OTP {3,8,2,9,0,1}, producing a summation result {13,41,10,12,35,1}. In operation 450, the first electronic device 100 may apply an offset to the summation result. The first electronic device 100 may set the offset to, e.g., 18. The first electronic device 100 may add the offset, 18, to each digit of numeral in the summation result. Further, similar to the example described above in connection with FIG. 3, the first electronic device may obtain a result by performing a mod operation of the size of the character set on the offset-applied summation result. Accordingly, the first electronic device 100 may obtain the offset-applied summation result, {31,23,28,30,17,19}.

In operation 460, the first electronic device 100 may map the offset-applied summation result to the character set to generate the first sub code. The first electronic device 100 may interpret the offset-applied summation result, "31," as an index in the character set to obtain the 31st character, "V." The first electronic device 100 may sequentially convert '23', '28', '30', '17', and '19' into characters and may accordingly generate the first sub code "VNSUHJ."

In operation 470, the first electronic device 100 may apply the offset to the first OTP. Accordingly, the first electronic device 100 may add the offset, 18, to each numeral in the first OTP, {3,8,2,9,0,1} to generate an offset-applied first OTP, {21,26,20,27,18}.

In operation 480, the first electronic device 100 may map the offset-applied first OTP to the character set to generate the second sub code. That is, the first electronic device 100 may interpret each numeral of {21,26,20,27,18} of the offset-applied first OTP as an index in the character set to generate the second sub code. For example, the first electronic device 100 may obtain the 21st character, "L," in the character set based on the first numeral "21" of the offset-applied first OTP. The first electronic device 100 may generate the second sub code "LQKRIJ" from {21,26,20, 27,18} of the offset-applied first OTP in the above-described manner.

In operation 490, the first electronic device 100 may generate the first code including the first sub code and the second sub code. The first electronic device 100 may generate the first code, e.g., "D5ACY1LQKRIJ," by concatenating the first sub code and the second sub code. As described above, the first sub code, "D5ACY1," of the first code is set by summating the OTP and unique code dynamically and randomly generated, guaranteeing dynamics and randomness as well as uniqueness by the unique code. However, since codes with the same summation result may occur with a lower probability, the first electronic device 100 may generate the first code, a unique code, by concatenating the second sub code according to an embodiment of the present disclosure.

In the following, the above-described code generation process is described through an algorithm.

---

- Definitions
 -C, a character set having different characters as its elements as represented in ASCII codes
   A given character set is denoted as C, where C consists of different characters (Alphabetic upper/lower case characters, special characters or symbols, or letters) represented in ASCII codes. For example, when C consists only of numerals, C = {'0', '1', '2', '3', '4', '5', '6', '7', '8', '9'} and there is no duplicate in number. Further, when C consists of numerals and upper case characters, C = {'0', . . . ,'9', 'A', . . . 'Z'}. In the same manner, the given character set C may take various forms. Elements in C may be shuffled in the same set. For example, when a character set consists only of numerals, e.g., C = {'0', '1', '2', '3', '4', '5', '6', '7', '8', '9'}, the following outcome may occur: C = {'8', '0', '7', '3', '1', '9', '6', '2', '4', '5'}.
 -S, number of the elements in a given character set C
 -C(n), nth element in C (0 <= n < number of numerals in C)
   The nth element in C is defined as C(n), where n is an integer meeting the following relation: 0 <= n < S. That is, n means an index of an element included in C. When a character set C is given consisting only of numerals, e.g., C = {'8', '0', '7', '3', '1', '9', '6', '2', '4', '5'}, 0 <= n < 10, and C(0) = '8', C(9) = '5'.
 -IndexOf(c), index in C for a given character c
   When the given character set C = {'8', '0', '7', '3', '1', '9', '6', '2', '4', '5'}, IndexOf('8') = 0, IndexOf('5') = 9.
 -U, a character string denoting a unique user ID randomly generated which consists of numerals in C
   When the given character set C = {'8', '0', '7', '3', '1', '9', '6', '2', '4', '5'}, U is represented as '0382' or '7192'.
 -U(n), nth character in U (0 <= n < number of characters in U)
   When the given U = '0382', n is an integer meeting the following relation: 0 <= n < 4, and U(2) = '8', U(3) = '2'.
 -T, TOTP code
   For example, a random six-digit TOTP code becomes '839023' or '659921'.

-T(n), nth numeral positioned in the TOTP code (0 <= n < number of digits in TOTP)

For example, when the generated TOTP code is '839023', T(0) = '8', and T(5) = '3'.

-N, length of random code (N >= 1)
-R, random code
-numOf(c), conversion of ASCII numeral c into a numeral
-Algorithm
written in a similar form to one by programming language C++.

```
String generate_random_id (C, U, N, T)
{
string preId,
    string postId,
    int offset = 18, // randomly designate
    for (n = 0, n < N, n++)
    {
        int d = numOf(T(n)), // convert T(n) ASCII code into a numeral,
'3' -> 3, '9' -> 9
        int x = IndexOf(U(n)),
        preId += C ( (d + x + offset) % S ), // append to a character
created in a previous step.
        postId += C ( (d + offset)%S),
    }
    return (preId + postId), // append two created characters to create
final R.
}
```

-Simulation
If,
N = 6,
C = { '0', . . ., '9', 'A', . . . , 'Z'}, and
S = 10 + 26 = 36
U = 'AX83Z0' and
T = '382901', then
0 <= n < 36, (0 . . . 35)
IndexOf(U) = { 10, 33, 8, 3, 35, 0 }, and
numOf (T) = { 3, 8, 2, 9, 0, 1 }, and
when an operation is performed on each digit,
preId[0] = C ( ( 3 + 10 + 18 ) % 36 ) = C ( 31 % 36 ) = C ( 31 ) = 'V'
preId[1] = C ( ( 8 + 33 + 18 ) % 36 ) = C ( 59 % 36 ) = C ( 23 ) = 'N'
preId[2] = C ( ( 2 + 8 + 18 ) % 36 ) = C ( 28 % 36 ) = C ( 28 ) = 'S'
preId[3] = C ( ( 9 + 3 + 18 ) % 36 ) = C ( 30 % 36 ) = C ( 30 ) = 'U'
preId[4] = C ( ( 0 + 35 + 18 ) % 36 ) = C ( 53 % 36 ) = C ( 17 ) = 'H'
preId[5] = C ( 1 + 0 + 18 ) % 36 ) = C ( 19 % 36 ) = C ( 19 ) = 'J'
and
postId[0] = C ( ( 3 + 18 ) % 36 ) = C ( 21 ) = 'L'
postId[1] = C ( ( 8 + 18 ) % 36 ) = C ( 26 ) = 'Q'
postId[2] = C ( ( 2 + 18 ) % 36 ) = C ( 20 ) = 'K'
postId[3] = C ( ( 9 + 18 ) % 36 ) = C ( 27 ) = 'R'
postId[4] = C ( ( 0 + 18 ) % 36 ) = C ( 18 ) = 'I'
postId[5] = C ( ( 1 + 18 ) % 36 ) = C ( 19 ) = 'J'
and
R = generate_random_id(C, U, N, T), and R = 'VNSUHJ LQKRIJ'.
-Simulation2-In case of different IDs at the same time
As above, N = 6, C = { '0', . . . , '9', 'A', . . . , 'Z'}, S = 10 + 26 = 36.
Instead, if U = 'B05EFA', and
T = '382901', then
0 <= n < 36, (0 . . . 35)
IndexOf(U) = { 11, 0, 6, 14, 15, 10 }, and
numOf (T) = { 3, 8, 2, 9, 0, 1 }, and
when an operation is performed on each digit,
preId[0] = C ( ( 3 + 11 + 18 ) % 36 ) = C ( 32 % 36 ) = C ( 31 ) = 'W'
preId[1] = C ( ( 8 + 0 + 18 ) % 36 ) = C ( 26 % 36 ) = C ( 26 ) = 'Q'
preId[2] = C ( ( 2 + 6 + 18 ) % 36 ) = C ( 26 % 36 ) = C ( 26 ) = 'Q'
preId[3] = C ( ( 9 + 14 + 18 ) % 36 ) = C ( 41 % 36 ) = C ( 5 ) = '5'
preId[4] = C ( ( 0 + 15 + 18 ) % 36 ) = C ( 33 % 36 ) = C ( 33 ) = 'X'
preId[5] = C ( 1 + 10 + 18 ) % 36 ) = C ( 29 % 36 ) = C ( 29 ) = 'T'
and
postId[0] = C ( ( 3 + 18 ) % 36 ) = C ( 21 ) = 'L'
postId[1] = C ( ( 8 + 18 ) % 36 ) = C ( 26 ) = 'Q'
postId[2] = C ( ( 2 + 18 ) % 36 ) = C ( 20 ) = 'K'
postId[3] = C ( ( 9 + 18 ) % 36 ) = C ( 27 ) = 'R'
postId[4] = C ( ( 0 + 18 ) % 36 ) = C ( 18 ) = 'I'
postId[5] = C ( ( 1 + 18 ) % 36 ) = C ( 19 ) = 'J'
and
R = generate_random_id(C, U, N, T), and R = 'WQQ5XT LQKRIJ'.

Accordingly, even when the same OTP comes out at the same time, different random codes bring up with different results.

Figure 5:
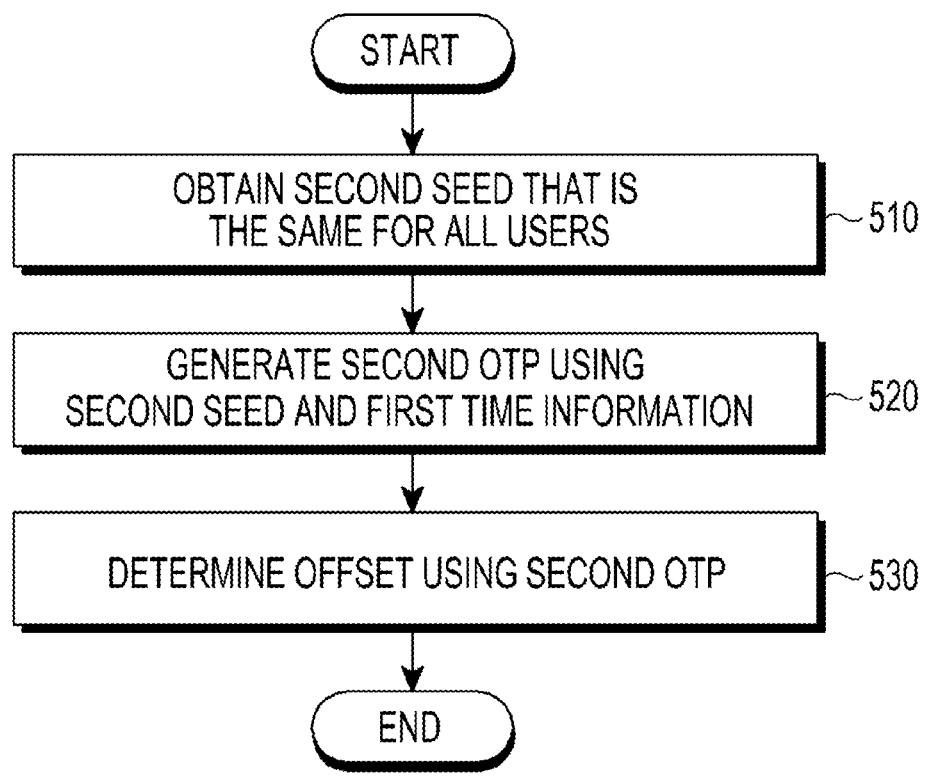
FIG. 5 is a flowchart illustrating an offset determination process according to an embodiment of the present disclosure.

FIG. 5 is a flowchart illustrating an offset determination process according to an embodiment of the present disclosure.

In operation 510, the first electronic device 100 may obtain the same second seed for all the users. Here, the second seed may be a seed value for generating, e.g., a time-based one-time password, and the second seed may differ from the first seed. In operation 520, the first electronic device 100 may generate a second OTP based on the second seed and the first time information, and in operation 530, the first electronic device 100 may determine an offset to be used in FIG. 4 using the second OTP. For example, the first electronic device 100 may set an offset with a resultant value obtained by performing a mod operation on the offset generated using the second seed with the number of elements in the character set. The second seed may be the same for all of the users enrolling in the system as well as the first user. Thus, the offset generated at the first time may be the same for all the users, and the generated code may remain unique.

Figure 6:
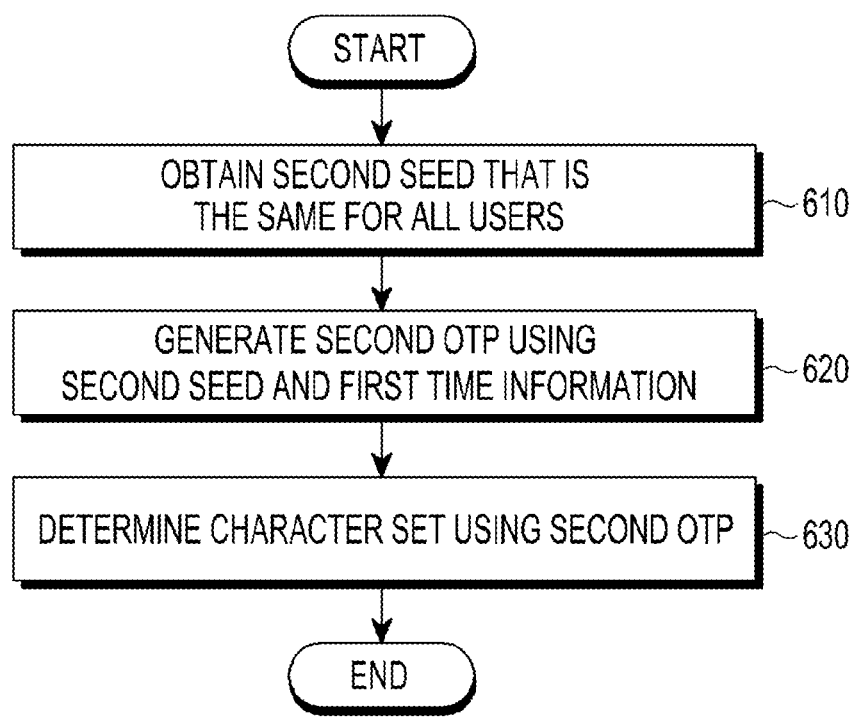
FIG. 6 is a flowchart illustrating a method for determining a character set according to an embodiment of the present disclosure.

FIG. 6 is a flowchart illustrating a method for determining a character set according to an embodiment of the present disclosure.

In operation 610, the first electronic device 100 may obtain the same second seed for all the users. Here, the second seed may be a seed value for generating, e.g., a time-based one-time password, and the second seed may differ from the first seed.

In operation 620, the first electronic device 100 may generate the second OTP using the second seed and the first time information. In operation 630, the first electronic device 100 may determine a character set using the second OTP. For example, the first electronic device 100 may first obtain a basic character set and determine a character set to be used for generating a code by varying the basic character set based on the second OTP.

Figure 7:
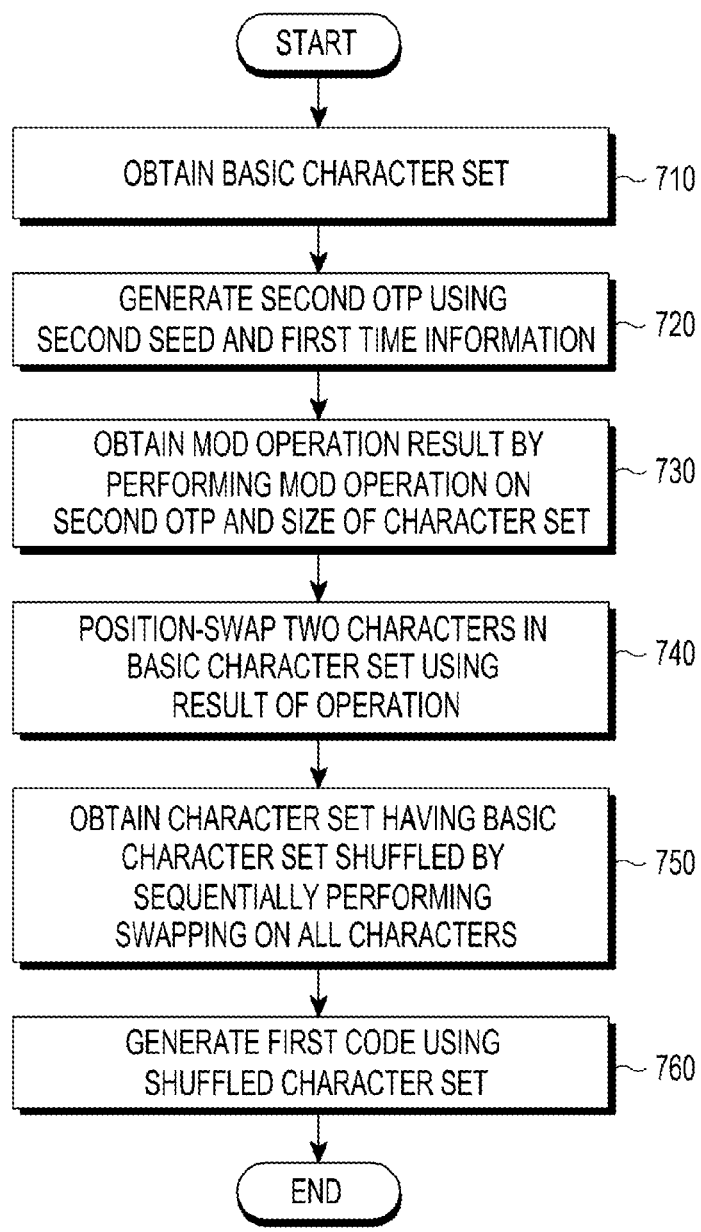
FIG. 7 is a flowchart illustrating a method for determining a character set according to an embodiment of the present disclosure.

FIG. 7 is a flowchart illustrating a method for determining a character set according to an embodiment of the present disclosure.

In operation 710, the first electronic device 100 may obtain a basic character set. For example, the first electronic device 100 may obtain a basic character set {'0', '1', '2', ..., '9'}. The number of elements in the basic character set may be 10.

In operation 720, the first electronic device 100 may generate the second OTP using the second seed and the first time information. According to an embodiment of the present disclosure, the first electronic device 100 may generate the second OTP with an hOTP algorithm. For example, the first electronic device 100 is assumed to generate the second OTP, "123456."

In operation 730, the first electronic device 100 may perform a mod operation on the second OTP and the character set to obtain a resultant value of the operation. In operation 740, the first electronic device 100 may swap two characters in position in the basic character set using the resultant value of the operation. For example, the first electronic device 100 may obtain 6 which is the result of the mod operation on 123456. The first electronic device 100 may swap the sixth character with the 0th character in the character set by interpreting the operation result of 6 as an index of the character set.

In operation 750, the first electronic device 100 may sequentially perform swapping on all of the characters to obtain a character set having the basic character set shuffled. For example, the first electronic device 100 may perform an OPT operation and mod operation on the first character in the character set and may swap the first character with the character corresponding to an index by interpreting the resultant value of the operation as the index, and the first electronic device 100 may perform the above-described process on all of the second character to the ninth character.

In operation 760, the first electronic device 100 may generate a first code using the shuffled character set.

As described above, since the character set may be dynamically varied, and as long as the seed is shared, the same character set may be generated for all of the users, the code generated as described above may remain unique.

An algorithm of the above-described character set shuffling method is described below.

1. Basic character set C={'0', '1', '2', '3', '4', '5', '6', '7', '8', '9'}.

2. A global key is set and is used as a seed of an OTP.

3. The following is repeated as many times as the size of the character set, thereby creating a random character set.

1) To vary the position of C(n), one HOTP is created, and a mod operation is performed with the size of a set.

2) When the HOTP is 123456, a mod operation is performed with 10 which is the size of the character set, thereby producing 6.

3) 6 as obtained means an index of C, and the numeral corresponding to C[6] is position-changed with the C[0]th character that is currently intended to be changed. That is, swapping is performed.

4) Processes 1, 2, and 3 are repeated nine times more up to C[9].

5) Upon completion of the above computation, a shuffled character set is produced, and this set is used to generate a random ID.

Simulation-character set shuffling

Character set C={0, 1, 2, 3, 4, 5, 6, 7, 8, 9}, and size S of C=10, 0<=n<10.

It is assumed that a value obtained by performing a modulo operation on the HOTP generated at each stage with S is O, and that O(0)=1111 2222% 10,
O(1)=3333 4444% 10,
O(2)=5555 6666% 10,
O(3)=7777 8888% 10,
O(4)=9999 0000% 10,
O(5)=1111 2222% 10,
O(6)=3333 4444% 10,
O(7)=5555 6666% 10,
O(8)=7777 8888% 10, and
O(9)=9999 0000% 10.

1) shuffle C[0]=0

Since O[0]=11112222% 10=2, swapping is conducted by putting C[2] at the position of C[0] while putting C[0] at the position of C[2]. Accordingly, the character set C={2, 1, 0, 3, 4, 5, 6, 7, 8, 9}.

2) shuffle C[1]=1

Since O[1]=33334444% 10=4, swapping is conducted by putting C[4] at the position of C[1] while putting C[1] at the position of C[4]. Accordingly, the character set C={2, 4, 0, 3, 1, 5, 6, 7, 8, 9}.

3) shuffle C[2]=0

Since O[2]=55556666% 10=6, swapping is conducted by putting C[6] at the position of C[2] while putting C[2] at the position of C[6]. Accordingly, the character set C={2, 4, 6, 3, 1, 5, 0, 7, 8, 9}.

4) shuffle C[3]=1

Since O[3]=77778888% 10=8, swapping is conducted by putting C[8] at the position of C[3] while putting C[3] at the position of C[8]. Accordingly, the character set C={2, 4, 6, 8, 1, 5, 0, 7, 3, 9}.

5) shuffle C[4]=4

Since O[4]=99990000% 10=0, swapping is conducted by putting C[0] at the position of C[4] while putting C[4] at the position of C[0]. Accordingly, the character set C={1, 4, 6, 8, 2, 5, 0, 7, 3, 9}.

6) shuffle C[5]=5

Since O[5]=1111 2222% 10=2, swapping is conducted by putting C[2] at the position of C[5] while putting C[5] at the position of C[2]. Accordingly, the character set C={1, 4, 5, 8, 2, 6, 0, 7, 3, 9}.

7) shuffle C[6]=0

Since O[6]=3333 4444% 10=4, swapping is conducted by putting C[4] at the position of C[6] while putting C[6] at the position of C[4]. Accordingly, the character set C={1, 4, 5, 8, 0, 6, 2, 7, 3, 9}.

8) shuffle C[7]=7

Since O[7]=5555 6666% 10=6, swapping is conducted by putting C[6] at the position of C[7] while putting C[7] at the position of C[6]. Accordingly, the character set C={1, 4, 5, 8, 0, 6, 7, 2, 3, 9}.

9) shuffle C[8]=3

Since O[8]=7777 8888% 10=8, swapping is conducted by putting C[8] at the position of C[8] while putting C[8] at the position of C[8]. Accordingly, the character set C={1, 4, 5, 8, 0, 6, 7, 2, 3, 9}.

10) shuffle C[9]=9

Since O[9]=9999 0000% 10=0, swapping is conducted by putting C[0] at the position of C[9] while putting C[9] at the position of C[0]. Accordingly, the character set C={9, 4, 5, 8, 0, 6, 7, 2, 3, 1}.

Thus, the shuffled character set C={'9', '4', '5', '8', '0', '6', '7', '2', '3', '1'}, and a random code is generated once using the shuffled character set.

As detailed above, the character set where the generated code is secured for its uniqueness may be shuffled.

Figure 8:
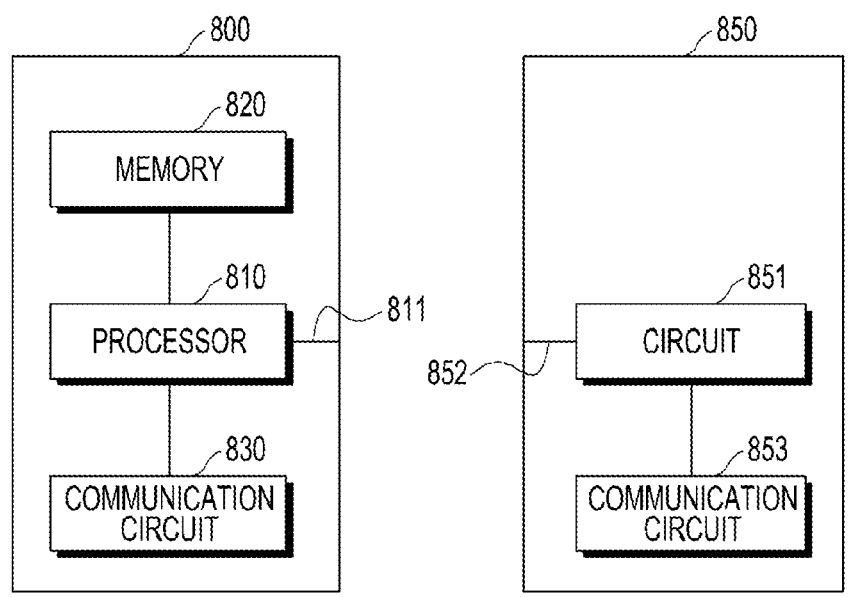
FIG. 8 is a block diagram illustrating a smart card and a card reader according to an embodiment of the present disclosure.

FIG. 8 is a block diagram illustrating a smart card and a card reader according to an embodiment of the present disclosure. As shown in FIG. 8, the smart card 800 may include a processor 810, a memory 820, and a communication circuit 830. The smart card 800 may have its own computational function on a surface of a plastic card formed in the same size of the same material as a typical credit card. It may be apparent to one of ordinary skill in the art that the smart card 800 may be implemented as a financial card or may be embedded in a passport and is not limited by a particular application as long as it performs authentication using particular information.

For example, the memory 820 may retain an operating system (e.g., a chip operating system (COS)). The operating system may store and manage applets stored in the memory 820 and communicate data from an applet to a hardware terminal. The applet stored in the memory 820 may mean a small-size application program created in a java language. The java language may mean an Internet-based programming language used to create a small-size program for processing simple functions, such as a small-size animation, drawing, displaying variations in weather, or displaying stock information, which is not required to be created in a large size due to limitations in capacity or speed. For example, an applet may output a unique and random code from security information stored in the memory 820. Specifically, the applet may be configured to output a unique and random code through the above-described processes using stored security information. Further, the memory 820 may store a first seed for generating a one-time password, a first unique code assigned to a first user, and a character set.

The processor 810 may output a code generated through, e.g., a data line 811, to the reader 850. The processor 810 may be driven with power received through the data line 811. Alternatively, the processor 810 may transmit the generated code to the communication circuit 853 of the reader 850 through the communication circuit 830. The communication circuit 830 may transmit the code received from the processor 810 to the communication circuit 853 based on various communication schemes, such as Bluetooth, Zigbee, infrared (IR) communication, visible ray communication, near field communication (NFC) communication, wireless fidelity (Wi-Fi) direct, etc. Accordingly, the smart card 800 may transmit a code generated in a contacting or contactless manner to the card reader 850.

The code received by the card reader 850 in a contacting or contactless manner may be provided to the processor 851. The processor 851 may generate a code. The processor 851 may determine whether the received code is appropriate or not by comparing the generated code with the received code. Or, the card reader 850 may forward the received code to a managing server. In such case, the managing server may generate a code and may determine whether the received code is appropriate by comparing the forwarded code with the generated code.

Figure 9:
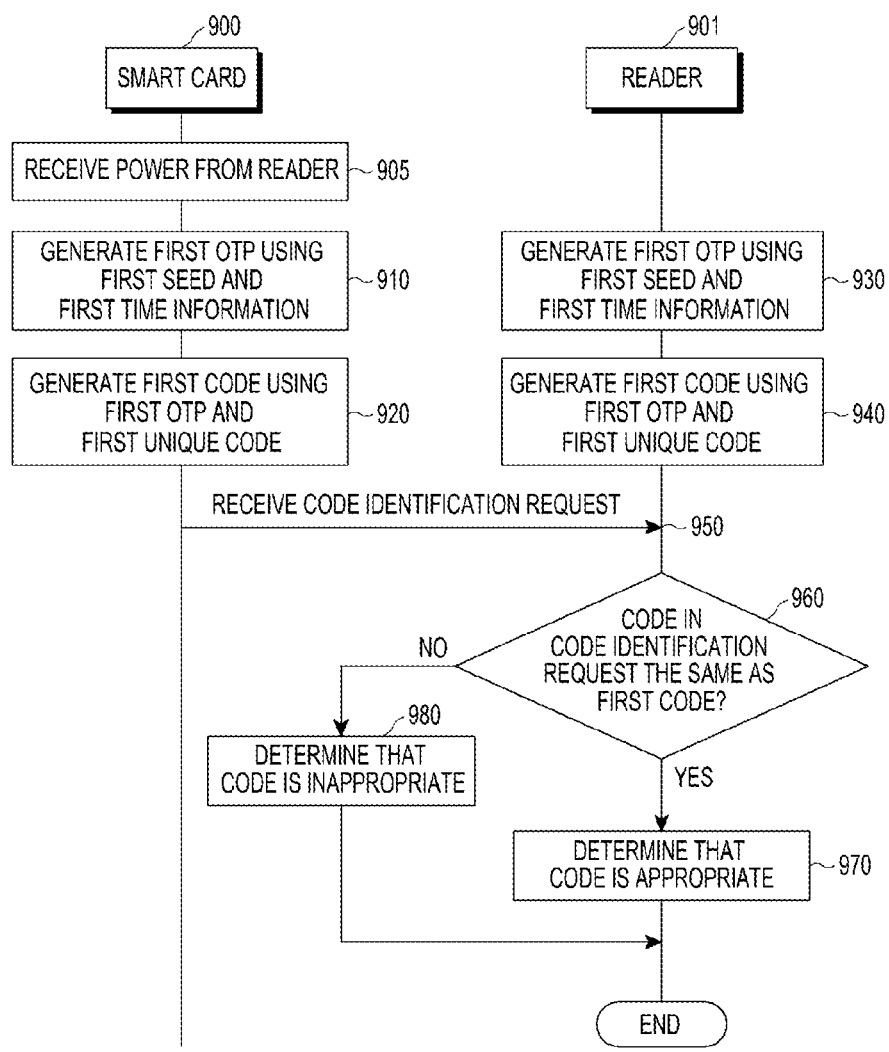
FIG. 9 is a flowchart illustrating an operation of a smart card and a reader according to an embodiment of the present disclosure.

FIG. 9 is a flowchart illustrating an operation of a smart card and a reader according to an embodiment of the present disclosure.

In operation 905, the smart card 900 may receive power from the reader 901. The smart card 900 may receive power through a data line or power line from the reader 901 or receive power wirelessly.

In operation 910, the smart card 900 may share a first unique code and a first seed with the reader 901. An assigned first unique code may be previously stored in the smart card 900. The reader 901 or the managing server may also previously store the first unique code. The first seed may be assigned to the first user to generate a time-based one-time password. The managing server may assign the first seed to the smart card 900, and the first seed may be stored in the smart card 900. The smart card 900 may generate a first one-time password (OTP) using the first seed and first time information. That is, the smart card 900 may generate the first OTP using the first time information and the first seed corresponding to a first time at the first time. Further, the smart card 900 may generate a second OTP using the first seed and second time information corresponding to a second time at the second time. The smart card 900 may dynamically vary the OTP over time and generate the OTP.

In operation 920, the smart card 900 may generate the first code using the first OTP and the first unique code. The process in which the smart card 900 generates the first code, which is random and unique, using the first OTP and the first unique code has been described above, and no further detailed description thereof is given. As the first code is generated using both the first OTP and the first unique code, the first OTP may be secured for randomness, likelihood of dynamic variation, and uniqueness of the first unique code, rendering it random and unique.

In operation 930, the reader 901 or the managing server may generate the first OTP using the first seed and the first time information. The reader 901 may generate the same first OTP as the one generated by the smart card 900 using the first seed and the first time information corresponding to the first time at the first time.

The reader 901 may generate the same second OTP as the one generated by the smart card 900 at the second time using the first seed and the second time information corresponding to the second time at the second time. That is, the reader 901 may dynamically vary and generate an OTP. In operation 940, the reader 901 may generate the first code using the first OTP and the first unique code.

In operation 950, the reader 901 may receive a code identification request from the smart card 900. That is, the reader 901 may receive the code generated by the smart card 900 in a contacting or contactless manner.

In operation 960, the reader 901 may determine whether the code in the code identification request is the same as the first code generated by the reader 901. When the code in the code identification request is the same as the first code generated by the reader 901, the reader 901 may determine that the code is appropriate in operation 980. When the code in the code identification request is different from the first code generated by the reader 901, the reader 901 may determine that the code is inappropriate in operation 970.

Figure 10:
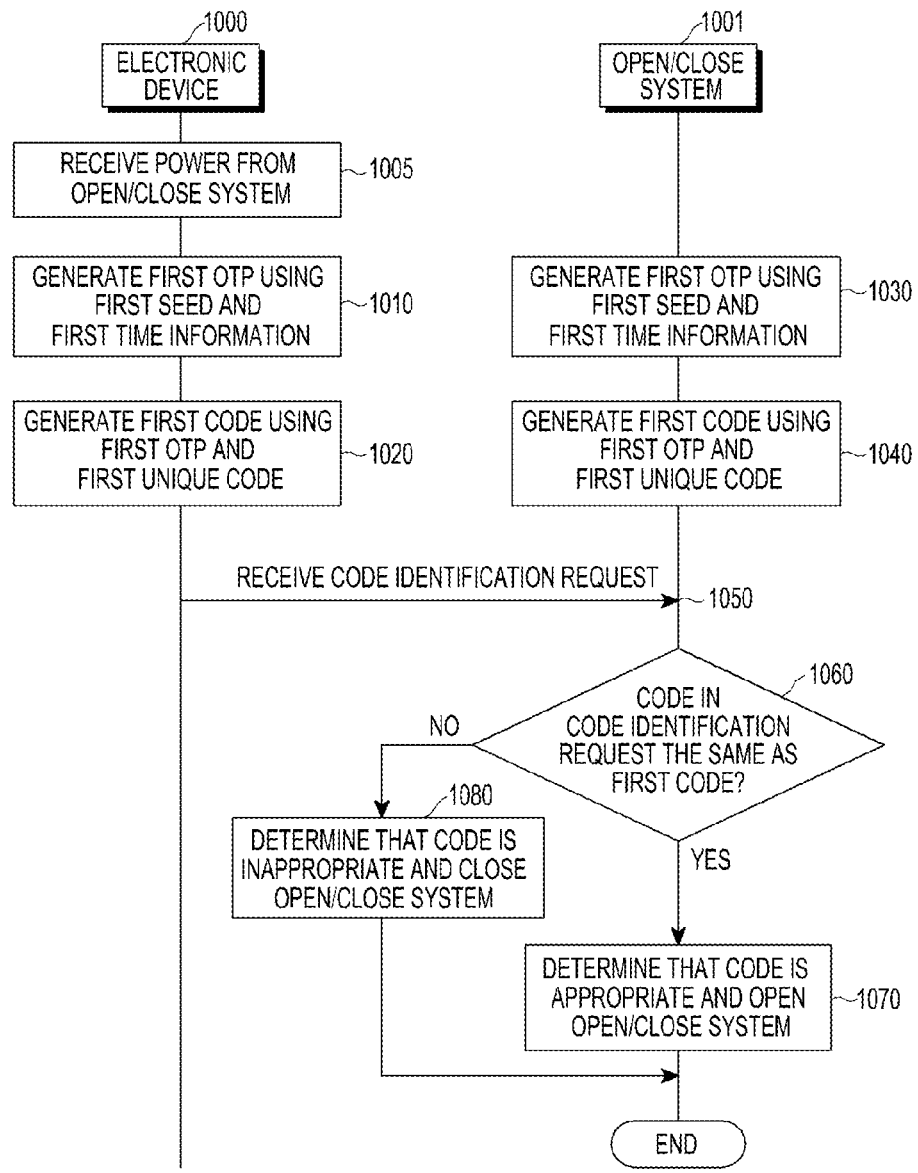
FIG. 10 is a flowchart illustrating an operation of an electronic device and an open/close system according to an embodiment of the present disclosure.

FIG. 10 is a flowchart illustrating an operation of an electronic device 1000 and an open/close system 1001 according to an embodiment of the present disclosure. The open/close system may be a door of a vehicle or a system requiring a security pass or may be implemented in various types.

In operation 1005, the electronic device 1000 may receive power from the open/close system 1001. The electronic device 1000 may receive power through a data line or power line from the open/close system 1001 or receive power wirelessly.

In operation 1010, the electronic device 1000 may generate a first one-time password (OTP) using the first seed and first time information. In operation 1020, the electronic device 1000 may generate a first code using the first OTP and the first unique code. The process in which the electronic device 1000 generates the first code, which is random and unique, using the first OTP and the first unique code has been described above, and no further detailed description thereof is given.

In operation 1030, the open/close system 1001 or the managing server may generate the first OTP using the first seed and the first time information. The open/close system 1001 may generate the same first OTP as the one generated by the electronic device 1000 using the first seed and the first time information corresponding to the first time at the first time.

The open/close system 1001 may generate the same second OTP as the one generated by the electronic device 1000 at the second time using the first seed and the second time information corresponding to the second time at the second time.

In operation 1050, the open/close system 1001 may receive a code identification request from the electronic device 1000. That is, the open/close system 1001 may receive the code generated by the electronic device 1000 in a contacting or contactless manner.

In operation 1060, the open/close system 1001 may determine whether the code in the code identification request is the same as the first code generated by the open/close system 1001. When the code in the code identification request is the same as the first code generated by the open/close system 1001, the open/close system 1001 may determine that the code is appropriate in operation 1080. When the code in the code identification request is different from the first code generated by the open/close system 1001, the open/close system 1001 may determine that the code is inappropriate in operation 1070.

Figure 11:
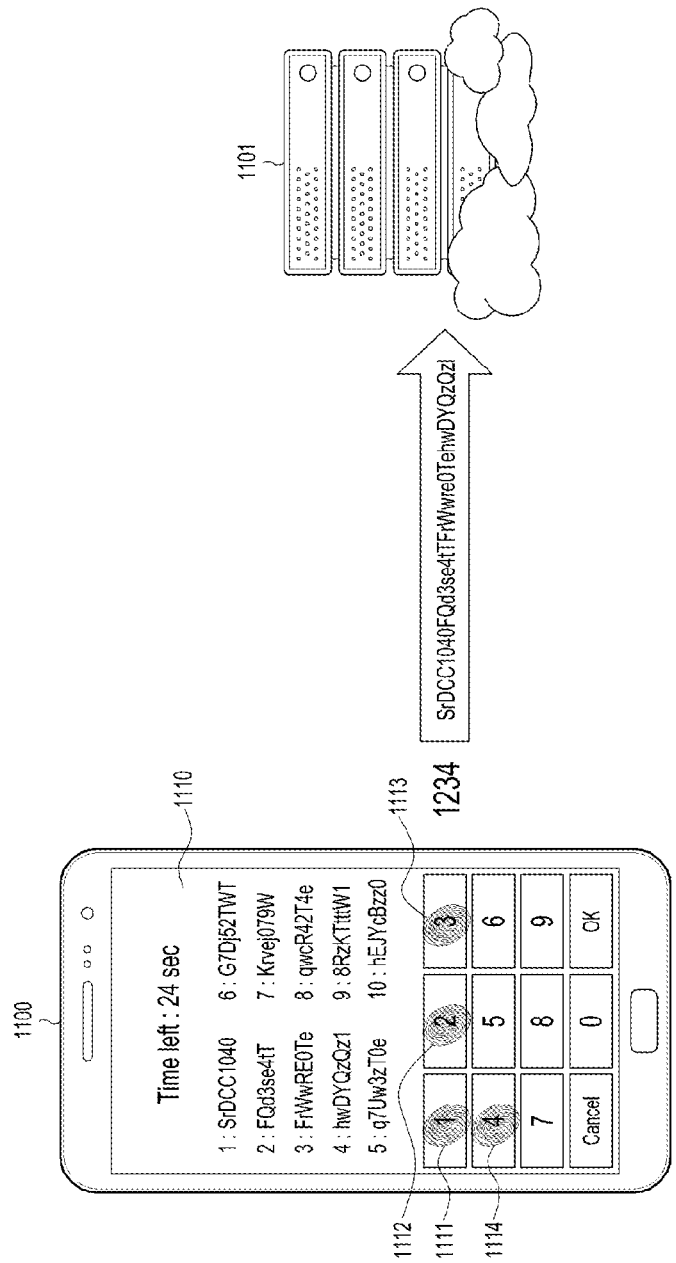
FIG. 11 is a concept view illustrating a multi-factor authentication system according to an embodiment of the present disclosure.

FIG. 11 is a concept view illustrating a multi-factor authentication system according to an embodiment of the present disclosure.

Figure 12:
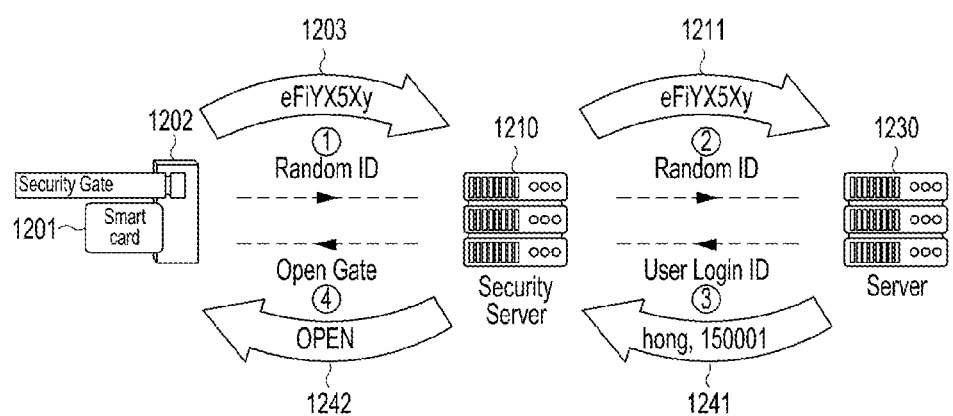
FIG. 12 is a concept view illustrating an authentication process by a smart card according to an embodiment of the present disclosure.

Referring to FIG. 11, the electronic device 1100 may display a screen 1110 for entry of a password. The screen 1100 for entry of a password may include a plurality of numerals. For example, the electronic device 1100 may detect continuous entry of "1" 1111, "2" 1112, "3" 1113, and "4" 1114 on the screen 1110 for entry of a password. The electronic device 1100 may generate a code, "SrDCC1040," using a unique code of "1" 1111 first entered. The electronic device 1100 may generate a code "FQd3se4tT" using a unique code of "2" 1112, a code "FrWwre0Te" using a unique code of "3" 1113, and a code "hwDYQzQkey" using a unique code of "4" 1114. The electronic device 1100 may send a string of the generated codes, "SrDCC1040FQd3se4tTFrWwre0TehwDYQzQ," to the managing server 1101. The managing server 1101 may compare a code "SrDCC1040FQd3se4tTFrWwre0TehwDYQzQ" using each numeral in "1234" previously stored with the code received from the electronic device 1100 and determine whether the code is appropriate depending on a result of the comparison. Accordingly, multi-factor authentication may be possible using the information, "1234," by the user's memory and a code generated therefrom. FIG. 12 is a concept view illustrating an authentication process by a smart card according to an embodiment of the present disclosure.

As shown in FIG. 12, the smart card 1201 may send a generated code to the security gate 1202 in a contacting or contactless manner. The smart card 1201 may wiredly or wirelessly receive power from the security gate 1202 and operate an applet using the received power to generate and output a code. The security gate 1202 may send the code 1203 received from the smart card 1201 to the security server 1210. The security server 1210 may send the code 1211 to the managing server 1230. The managing server 1230 may previously generate a code and compare the received code 1211 with the generated code. When a result of the comparison shows that the previously generated code is identical with the received code 1211, the managing server 1230 may send a corresponding user identification (ID) and password-related information 1241 to the security server 1210. The security server 1210 may send an open command 1242 to the security gate 1202 based on the received user ID and password-related information 1241. The security gate 1202 may open the door according to the received open command 1242. Meanwhile, unless the result of the comparison by the managing server 1230 shows that the pre-generated code is identical with the received code 1211, an authentication fail message may be sent to the security server 1210, and in such case, the security server 1210 may send a close command to the security gate 1202.

Figure 13:
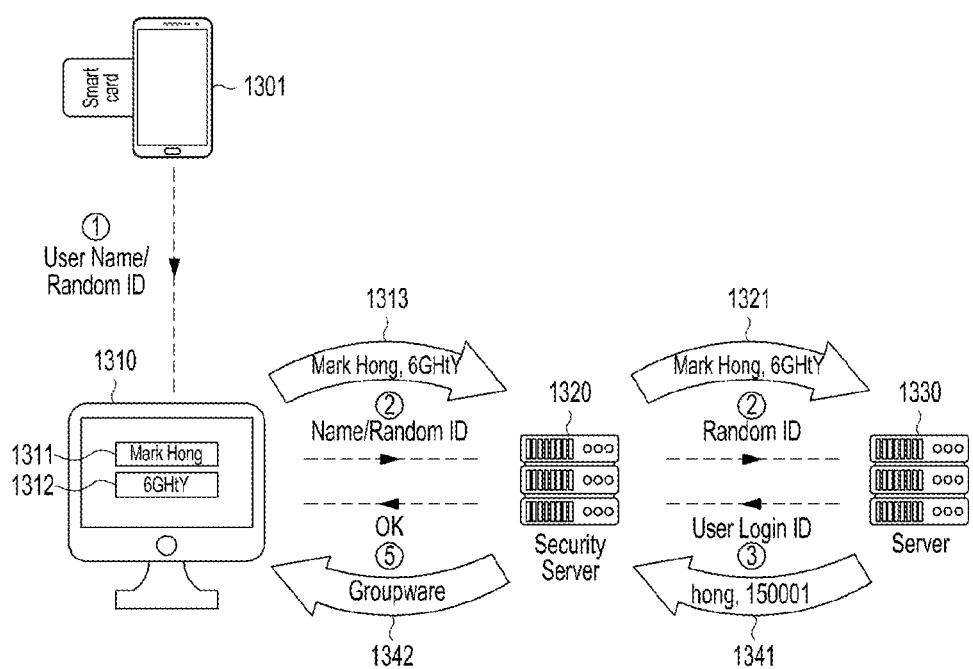
FIG. 13 is a concept view illustrating a system login process according to an embodiment of the present disclosure.

FIG. 13 is a concept view illustrating a system login process according to an embodiment of the present disclosure.

The electronic device 1301 may be implemented in a structure where a smart card may be inserted. Accordingly, the smart card may receive power from the electronic device 1301 to run an applet, and the smart card may output a code generated as a result of running the applet to the electronic device 1301. The electronic device 1301 may display a code (Random ID) received from the smart card together with a user name. The user may identify the same and may put the user name 1311 and the displayed code (e.g., 6GHtY) 1312 in the login window in a device 1310 capable of groupware login, such as a computer. The device 1310 capable of groupware login may send the entered user name and code 1313 to a groupware server 1320, and the groupware server 1320 may forward the user name and the code 1321 to the managing server 1330.

The managing server 1330 may previously generate a code and compare the pre-generated code with the received code. When a result of the comparison shows that the pre-generated code is the same as the received code, the managing server 1330 may send the user name and the password-related information 1341 to the groupware server 1320. The groupware server 1320 may send a groupware login-related message 1342 to the device 1310 capable of groupware login based on the received user ID and password-related information 1341. Meanwhile, unless the result of the comparison by the managing server 1330 shows that the pre-generated code is identical with the received code 1321, an authentication fail message may be sent to the groupware server 1320, and in such case, the groupware server 1320 may send a login fail message. Meanwhile, as described above in connection with FIGS. 12 and 13, one smart card may be used to perform authentication both online and offline.

Figure 14:
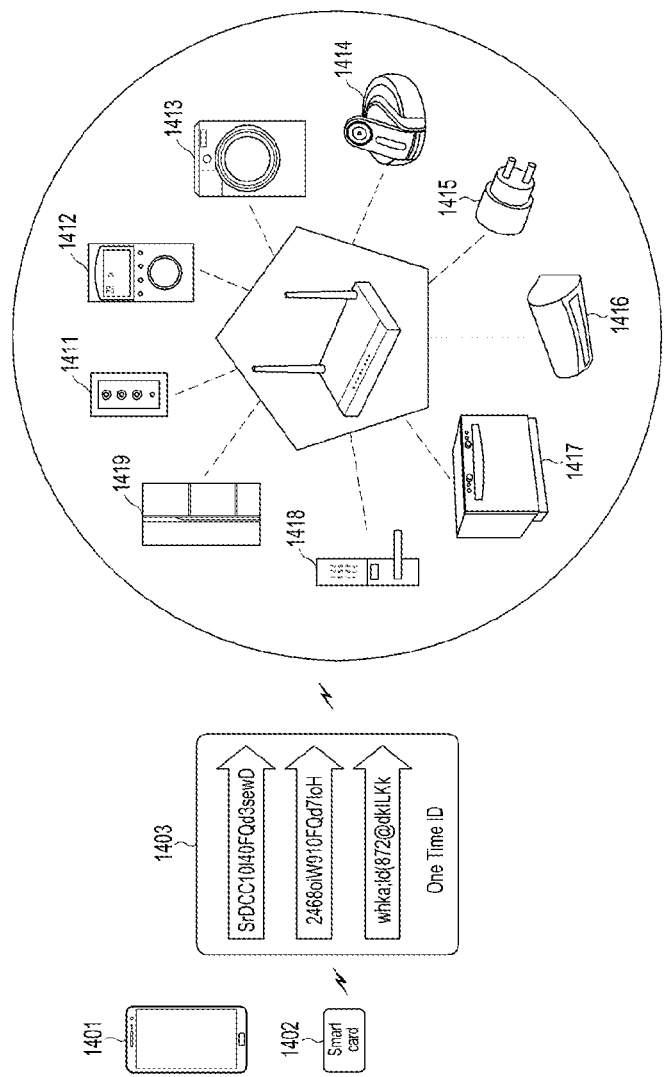
FIG. 14 is a concept view illustrating an operation of an electronic device under an IoT environment according to an embodiment of the present disclosure.

FIG. 14 is a concept view illustrating an operation of an electronic device under an Internet of things (IoT) environment according to an embodiment of the present disclosure.

The electronic device 1401 or the smart card 1402 may generate a code 1403 and send the code 1403 to a home network control point 1410. The electronic device 1401 or the smart card 1402 may also send a control signal for at least one of a plurality of electronic devices 1411 to 1419 in the home network. Meanwhile, the control point 1410 may generate a code and compare the generated code with the received code 1403. When a result of the comparison shows that the generated code is identical with the received code 1403, the control point 1410 may control an electronic device to perform the corresponding command. Accordingly, e.g., a gas valve control system directly related to the user's safety may be controlled under a security guaranteed environment.

As is apparent from the foregoing description, according to an embodiment of the present disclosure, there are provided an electronic device and method for generating a random and unique code. The generated random and unique code may be used for various technical applications, e.g., as IDs to distinguish users over a system, input codes for electronic commerce, or identification codes of print-outs that are substitutes for money, e.g., gift vouchers. In particular, according to embodiments of the present disclosure, the electronic device and method may dynamically generate random and unique codes over time, significantly reducing the probability of code leakage.

Meanwhile, the present disclosure may apply to any application requiring authentication. For example, according to the present disclosure, a gift voucher generator may generate unique and random codes through the above-described algorithm, assign them to the respective types of gift vouchers, and share them with an authentication system. The authentication system, upon reception of a gift voucher number through an online use system, may perform authentication by comparing the received gift voucher number with a previously shared gift voucher number. As described above, the generated code is guaranteed for its uniqueness and randomness, preventing others from guessing and generating the gift voucher number.

What is claimed is:

1. A method comprising:
obtaining, by a processor of a first electronic device, a first seed for generating a one-time password (OTP), a character set and a first unique code assigned to a first user, wherein the first unique code is generated by a server;
generating, by the processor, a first OTP using the first seed;
generating, by the processor, a numerical code that corresponds to the first unique code by forward-mapping characters in the first unique code to the character set;
summating, by the processor, the numerical code with the first OTP to obtain a summation result;
backward-mapping, by the processor, the summation result to the character set to obtain characters among the character set, each index thereof corresponding to each numeral value of the summation result;
generating, by the processor, a first sub code that corresponds to the backward-mapped summation result;
backward-mapping, by the processor, the first OTP to the character set to obtain characters among the character set, each index thereof corresponding to each numeral value of the first OTP;
generating, by the processor, a second sub code that corresponds to the backward-mapped first OTP; and
generating, by the processor, a first code using the first sub code and the second sub code, wherein the second sub code is different from the first code,
wherein a second electronic device is configured to perform authentication of the first electronic device based on a comparison between the first code generated by the first electronic device and a second code generated by the second electronic device.

2. The method of claim 1, wherein generating the first OTP using the first seed includes
generating the first OTP by inputting the first seed and first time information corresponding to a first time to a time-based OTP algorithm.

3. The method of claim 1, wherein generating the first sub code by backward-mapping the summation result to the character set includes performing a mod operation on the summation result with a size of the character set and generating the first sub code by backward-mapping a result of performing the mod operation on the summation result to the character set.

4. The method of claim 1, wherein generating the first sub code by backward-mapping the summation result to the character set includes applying a preset offset to the summation result and generating the first sub code by backward-mapping the offset-applied summation result to the character set.

5. The method of claim 4, wherein generating the first sub code by backward-mapping the offset-applied summation result to the character set includes performing a mod operation on the offset-applied summation result with a size of the character set and generating the first sub code by backward-mapping a result of performing the mod operation on the summation result to the character set.

6. The method of claim 4, wherein generating the second sub code by backward-mapping the first OTP to the character set includes applying a preset offset to the first OTP and generating the second sub code by backward-mapping the offset-applied first OTP to the character set.

7. The method of claim 6, further comprising:
performing a mod operation on the offset-applied first OTP with a size of the character set; and
generating the second sub code by backward-mapping a result of performing the mod operation on the first OTP to the character set.

8. The method of claim 1, wherein obtaining the character set includes obtaining a basic character set and obtaining the character set by shuffling an element in the basic character set.

9. The method of claim 8, wherein shuffling the element in the basic character set includes obtaining a second seed that is same for all users in a system, generating a second OTP using the second seed, and swapping an element of each digit in the basic character set with an element of another digit using a result obtained by performing a mod operation on the second OTP with the element in the basic character set.

10. An electronic device, comprising:
a communication module;
a memory that stores a first seed for generating a one-time password (OTP), a character set and a first unique code assigned to a first user, wherein the first unique code is generated by a server; and
a processor, wherein the processor is configured to:
generate a first OTP using the first seed;
generate a numerical code that corresponds to the first unique code by forward-mapping characters in the first unique code to the character set;
summate the numerical code with the first OTP to obtain a summation result;
backward-map the summation result to the character set to obtain characters among the character set, each index thereof corresponding to each numeral value of the summation result;
generate a first sub code that corresponds to the backward-mapped summation result;
backward-map the first OTP to the character set to obtain characters among the character set, each index thereof corresponding to each numeral value of the first OTP;
generate a second sub code that corresponds to the backward-mapped first OTP;
generate a code using the first sub code and the second sub code, wherein the second sub code is different from the code; and
transmit the generated code to another electronic device through the communication module,
wherein the electronic device is authenticated based on a comparison between the code generated and transmitted by the electronic device and another code generated by an authentication device performing authentication.

11. The electronic device of claim 10, wherein the electronic device is a smart card, and the another electronic device is the authentication device.

12. The electronic device of claim 10, wherein the electronic device is a smart card, and the another electronic device is an electronic device relaying the generated code, and wherein the another electronic device relays the generated code to the authentication device.

13. The electronic device of claim 10, wherein the electronic device is a smart card, and the another electronic device is an open/close system that is configured to receive the code generated by and transmitted from the electronic device.

14. The electronic device of claim 13, wherein the open/close system is configured to perform authentication using the received code or request the authentication device to authenticate the received code.

15. The electronic device of claim 14, wherein the open/close system controls opening/closing of a system based on a result of the authentication or an authentication result received from the authentication device.

16. The electronic device of claim 10, wherein the another electronic device is an electronic device configuring a home network.

17. The electronic device of claim 16, wherein the electronic device configuring the home network is configured to control the electronic device configuring the home network or another electronic device configuring the home network based on an authentication result.

18. An electronic device performing authentication, the electronic device comprising:
a communication module that receives a first code from another electronic device;
a memory that stores a first seed for generating a one-time password (OTP), a character set and a first unique code assigned to a first user, wherein the first unique code is generated by a server; and
a processor, wherein the processor is configured to:
generate a first OTP using the first seed;
generate a numerical code that corresponds to the first unique code by forward-mapping characters in the first unique code to the character set;
summate the numerical code with the first OTP to obtain a summation result;
backward-map the summation result to the character set to obtain characters among the character set, each index thereof corresponding to each numeral value of the summation result;
generate a first sub code that corresponds to the backward-mapped summation result;
backward-map the first OTP to the character set to obtain characters among the character set, each index thereof corresponding to each numeral value of the first OTP;
generate a second sub code that corresponds to the backward-mapped first OTP;
generate a second code using the first sub code and the second sub code, wherein the second sub code is different from the second code; and
upon determining that the second code is identical with the first code received through the communication module, perform authentication, and upon determining that the second code is different from the first code received through the communication module, reject authentication,
wherein the electronic device is configured to perform authentication of the another electronic device based on a comparison between the first code generated by the another electronic device and the second code generated by the electronic device.

19. The electronic device of claim 18, wherein the electronic device performing the authentication transmits power to a smart card to generate the first code, and the communication module receives the first code from the smart card.

* * * * *